United States Patent
Cunha et al.

(10) Patent No.: US 6,932,571 B2
(45) Date of Patent: Aug. 23, 2005

(54) MICROCIRCUIT COOLING FOR A TURBINE BLADE TIP

(75) Inventors: Frank Cunha, Avon, CT (US); Bryan Dube, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 167 days.

(21) Appl. No.: 10/358,646

(22) Filed: Feb. 5, 2003

(65) Prior Publication Data

US 2004/0151587 A1 Aug. 5, 2004

(51) Int. Cl.$^7$ ................................................ F01D 5/18
(52) U.S. Cl. .................................................. 416/97 R
(58) Field of Search ........................ 415/115; 416/97 R (56) References Cited

U.S. PATENT DOCUMENTS

| | | | | |
|---|---|---|---|---|
| 5,261,789 A | * | 11/1993 | Butts et al. ............... | 416/96 R |
| 5,476,364 A | * | 12/1995 | Kildea ....................... | 416/95 |
| 6,164,914 A | * | 12/2000 | Correia et al. ............ | 416/97 R |
| 6,247,896 B1 | | 6/2001 | Auxier et al. .............. | 416/97 R |
| 6,280,140 B1 | | 8/2001 | Soechting et al. ......... | 416/97 R |
| 6,402,470 B1 | | 6/2002 | Kvasnak et al. ........... | 416/97 R |
| 6,514,042 B2 | | 2/2003 | Kvasnak et al. ........... | 416/97 R |
| 6,609,894 B2 | * | 8/2003 | Jackson et al. ............ | 416/224 |
| 6,705,831 B2 | * | 3/2004 | Draper ....................... | 415/115 |

* cited by examiner

Primary Examiner—Ninh H. Nguyen
(74) Attorney, Agent, or Firm—Linda A. P. Cunha (57) ABSTRACT

An improved cooling design and method for cooling airfoils within a gas turbine engine is provided which includes an embedded microcircuit that traverses a tip between a suction sidewall and a pressure sidewall of the airfoil. The microcircuit includes at least on inlet disposed proximate to the tip and one of the sidewalls for receiving cooling air from an internal cooling cavity of the airfoil and at least outlet disposed proximate to the tip through which the cooling air ejects into a region outside the airfoil.

44 Claims, 4 Drawing Sheets

MICROCIRCUIT COOLING FOR A TURBINE BLADE TIP

The government may have rights in this invention, pursuant to Contract Number F33615-02-C-2202, awarded by the United States Air Force, Wright Patterson Air Force Base.

TECHNICAL FIELD

This invention relates to coolable airfoils of the type used in high temperature rotary machines such as gas turbines and, more particularly, to an improved tip cooling scheme for airfoils.

BACKGROUND OF THE INVENTION

Efficiency is a primary concern in the design of any gas turbine engine. Historically, one of the principle techniques for increasing efficiency has been to increase the gas path temperatures within the engine. Using internally cooled components made from high temperature capacity alloys has accommodated the increased temperatures. Turbine stator vanes and blades, for example, are typically cooled using compressor air worked to a higher pressure, but still at a lower temperature than that of the core gas flow passing by the blade or the vane. It will be understood that compressor bleed air for such cooling will be unavailable to support combustion in the combustor. The higher pressure provides the energy necessary to push the air through the component. A significant percentage of the work imparted to the air bled from the compressor, however, is lost during the cooling process. The lost work does not add to the thrust of the engine and negatively effects the overall efficiency of the engine. A person of skill in the art will recognize therefore, that there is a tension between the efficiency gained from higher core gas path temperatures and the concomitant need to cool turbine components and the efficiency lost from bleeding air to perform that cooling. There is, accordingly, great value in maximizing the cooling efficiency of whatever cooling air is used.

Thus, to minimize any sacrifice in engine performance due to unavailability of cooling airflow to support combustion, any scheme for cooling blades and vanes must optimize the utilization of compressor bleed cooling air. Airfoil cooling is accomplished by external film cooling, internal air impingement and forced convection either separately or a combination of all cooling methods.

In forced convection cooling, compressor bleed air flows through the internal cavities of the blades and vanes, continuously removing heat therefrom. Compressor bleed air enters the cavities 38 through one or more inlets which discharges into the internal cavities.

Film cooling has been shown to be very effective but requires a great deal of fluid flow to be bled off the compressor for cooling. Further, film cooling is actively controlled in a complex and expensive manner. Also, the fabrication and machining of an airfoil with film cooling holes adds a degree of complexity that is costly. It will also be appreciated that once the cooling air exits the internal cavity of the airfoil and mixes with the hot gases, a severe performance penalty is incurred due to the mixing process and the different temperature levels of the mixing flows. Thus, film cooling requires a greater amount of cooling air with the possibility of inadequate cooling of the outer surfaces of the airfoil.

Prior art coolable airfoils typically include a plurality of internal cavities (cooling circuit), which are supplied with cooling air. The cooling air passes through the wall of the airfoil (or the platform) and transfers thermal energy away from the airfoil in the process. Typically in the prior art, blade tip film cooling holes provide external film cooling issued on the blade tip pressure side in the radial and axial directions. Some designs use as many film holes as possible, in the limited space available, in an effort to flood the pressure side tip region with coolant. It is desired that this film cooling then carry over onto the outer tip surface to provide cooling there and also over the suction side surfaces of tip. Film holes are oriented in the radially outward direction because the prevailing mainstream gas flows tend to migrate in this manner in the tip region. In practice, it is still very difficult and very inconsistent to cool the blade tip in this manner due to the very complex nature of the cooling flow as it mixes with very dynamic hot gases of the mainstream flow.

In some prior art arrangements, cooling flow exits the film holes and is swept by the hot combustion gases towards the trailing edge of the airfoil and away from tip cap. Typically, this results in a mixed effect, where some of the cooling air is caught up and mixed with the hot gases and some goes onto tip cap and some goes axially along the airfoil to trailing edge. This results in inadequate cooling of tip cap and eventual temperature inflicted degradation of tip cap.

Turbine engine blade designers and engineers are constantly striving to develop more efficient ways of cooling the tips of the turbine blades to prolong turbine blade life and reduce engine operating cost. Cooling air used to accomplish this is expensive in terms of overall fuel consumption. Thus, more effective and efficient use of available cooling air in carrying out cooling of turbine blade tips is desirable not only to prolong turbine blade life but also to improve the efficiency of the engine as well, thereby again lowering engine operating cost. Consequently, there is a continuing need for a cooling design that will make more effective and efficient use of available cooling air.

SUMMARY OF THE INVENTION

The above discussed and other drawbacks and deficiencies are overcome or alleviated by the present invention.

The present invention provides a microcircuit cooling system that employs a new and effective approach to convectively cool a tip of an airfoil in combination with film cooling. In particular, this combination provides an advantage over the prior art tip cooling schemes in that, to achieve the same metal temperature at the tip, less cool compressor air is required to cool the tip. Less compressor bleed flow results in the additional advantage of providing an increase in turbine efficiency.

The cooling system of the present invention employs at least one plenum traversely disposed between the pressure and suction sidewalls of the airfoil. A plurality of inlets and a plurality of outlets are in flow communication with the plenum. Cooling air, supplied from the cooling circuit of the airfoil, enters said inlets, transitions into said plenum and exits said outlets into a region outside the airfoil. It is preferred that the plenum includes a plurality of micropassages through which the cooling air flows through.

As described above, the present invention can be implemented and utilized in connection with many alternative airfoil (blade and vane) configurations. The combination of a) effective convective cooling provided by the micropassages and b) effective thermal insulation on the tip surface due to film cooling provides a cooler tip, as compared to conventional and current designs. Thus, an airfoil tip employing the beneficial cooling design of the present invention will not only have a longer service life but also improve overall turbine efficiency.

The present invention also contemplates a method for cooling a tip of a turbine blade suitable for use in gas turbine, comprising the steps of a) fabricating a microcircuit under a surface of the tip and b) providing cooling flow from a cooling flow source to flow into an inlet of the microcircuit, through a plurality of micropassages, and out of an outlet of the microcircuit to exit into the gas stream at the tip of the blade.

BRIEF DESCRIPTION OF THE DRAWINGS

The present invention will now be described, by way of example, with reference to the accompanying drawings in which.

DETAILED DESCRIPTION OF THE INVENTION

Figure 1:
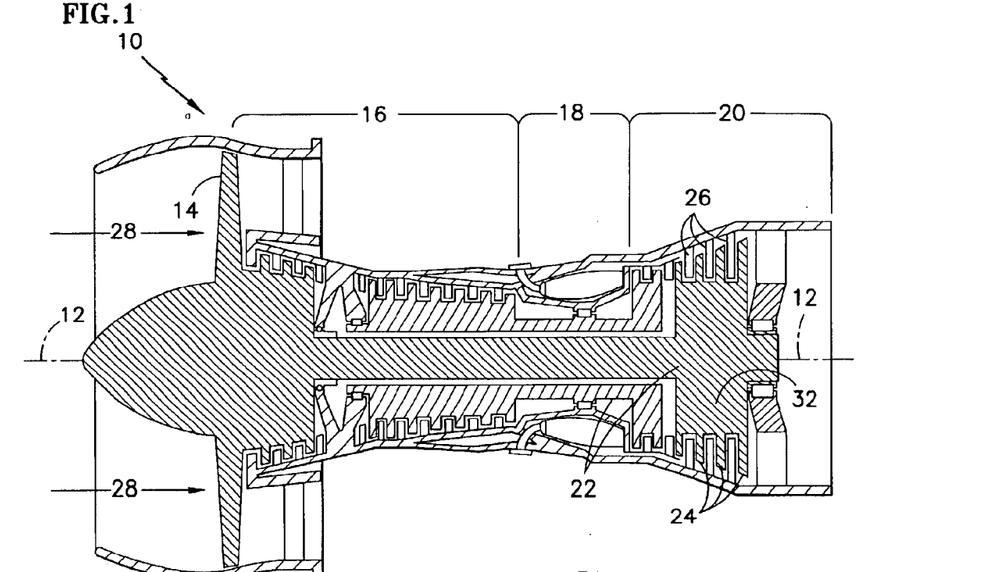
FIG. 1 is a simplified cross-sectional view of a gas turbine engine of the type employing the turbine airfoils of the present invention.

A gas turbine engine 10, such as a gas turbine used for power generation or propulsion, circumferentially disposed about an engine centerline, or axial centerline axis 12 is shown. The engine 10 includes a fan 14, a compressor 16 (FIG. 1), a combustion section 18 and a turbine 20. As is well known in the art, air compressed in the compressor 16 (FIG. 1) is mixed with fuel which is burned in the combustion section 18 and expanded in turbine 20. The air compressed in the compressor 16 (FIG. 1) and the fuel mixture expanded in the turbine 20 can both be referred to as a hot gas stream flow (hot combustion gases, gas flow) 28. The turbine 20 includes rotors 22 which, in response to the expansion, rotate driving the compressor 16 (FIG. 1) and fan 14. The turbine 20 comprises alternating rows of rotary airfoils or blades 24 and static airfoils or vanes 26. The use of the system of FIG. 1 is for illustrative purposes only and is not a limitation of the instant invention which may be employed on gas turbines used for electrical power generation and aircraft.

Figure 2:
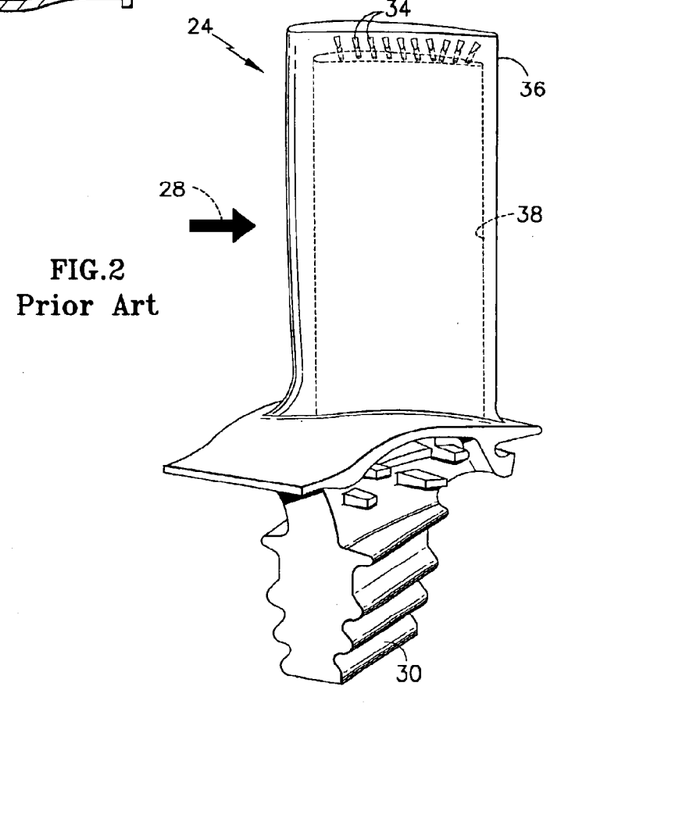
FIG. 2 is a perspective view of a typical turbine blade showing a form of current practice of film cooling for the tip of the blade.

Referring now to FIG. 2, a typical blade 24 is shown. Each blade 24 has a dovetail 30 which retains the blade 24 in a complementary dovetail slot formed in the perimeter of a rotor disk 32 (FIG. 1). Typically, a plurality of blade tip film cooling holes 34 is disposed within an outer end portion or tip 36 of the blade 24 and is fed by at least one internal cooling cavity (cavity) 38. The internal cavity is fed cooling air from the compressor 16 (FIG. 1). The film cooling holes 34 provide external film cooling issued on the tip 36 in generally the radial direction. Some designs use as many film cooling holes as possible in an effort to flood the tip region with the cooling air to cool the tip 36. In practice, it is very difficult to achieve uniform cooling of the tip 36 due to the complex nature of the mixing of the cooling air ejected from the film holes with the hot combustion gases 28 traveling through the turbine 20 (FIG. 1).

Figure 3A:
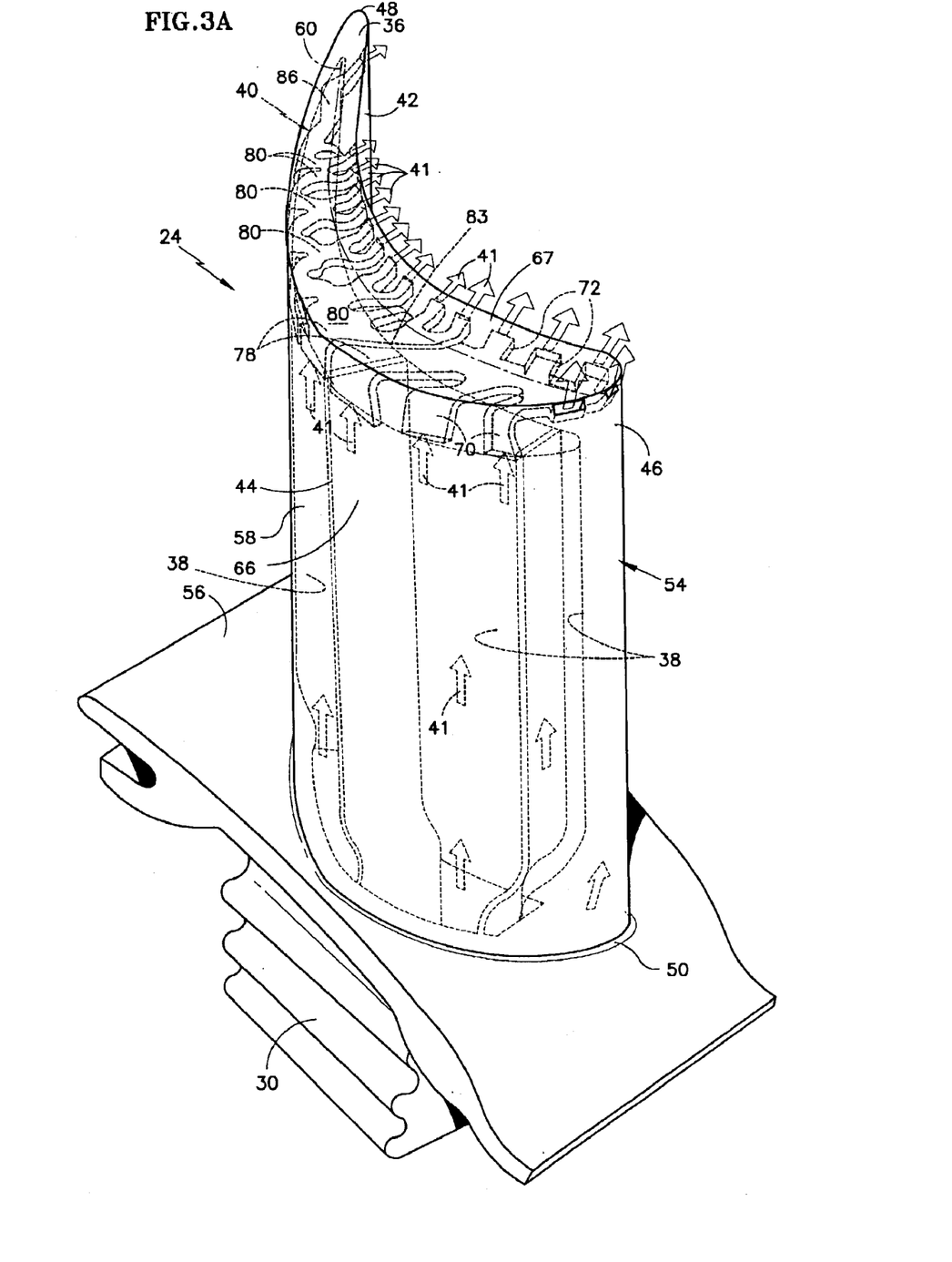
FIG. 3A is a perspective view of an airfoil incorporating the microcircuit cooling scheme of the present invention.

Referring now to FIG. 3A, the blade tip cooling design of the present invention is shown. In contrast to the blade tip cooling design shown in FIG. 1, the present invention employs an embedded microcircuit 40 in the tip 36 of the blade 24 to provide convective and film cooling of the tip 36. It is noted that the microcircuit 40 shown in FIG. 3A illustrates the flow path of the cooling air (cooling flow) 41 at it transitions through the microcircuit 40.

Figures 3B, 3C:
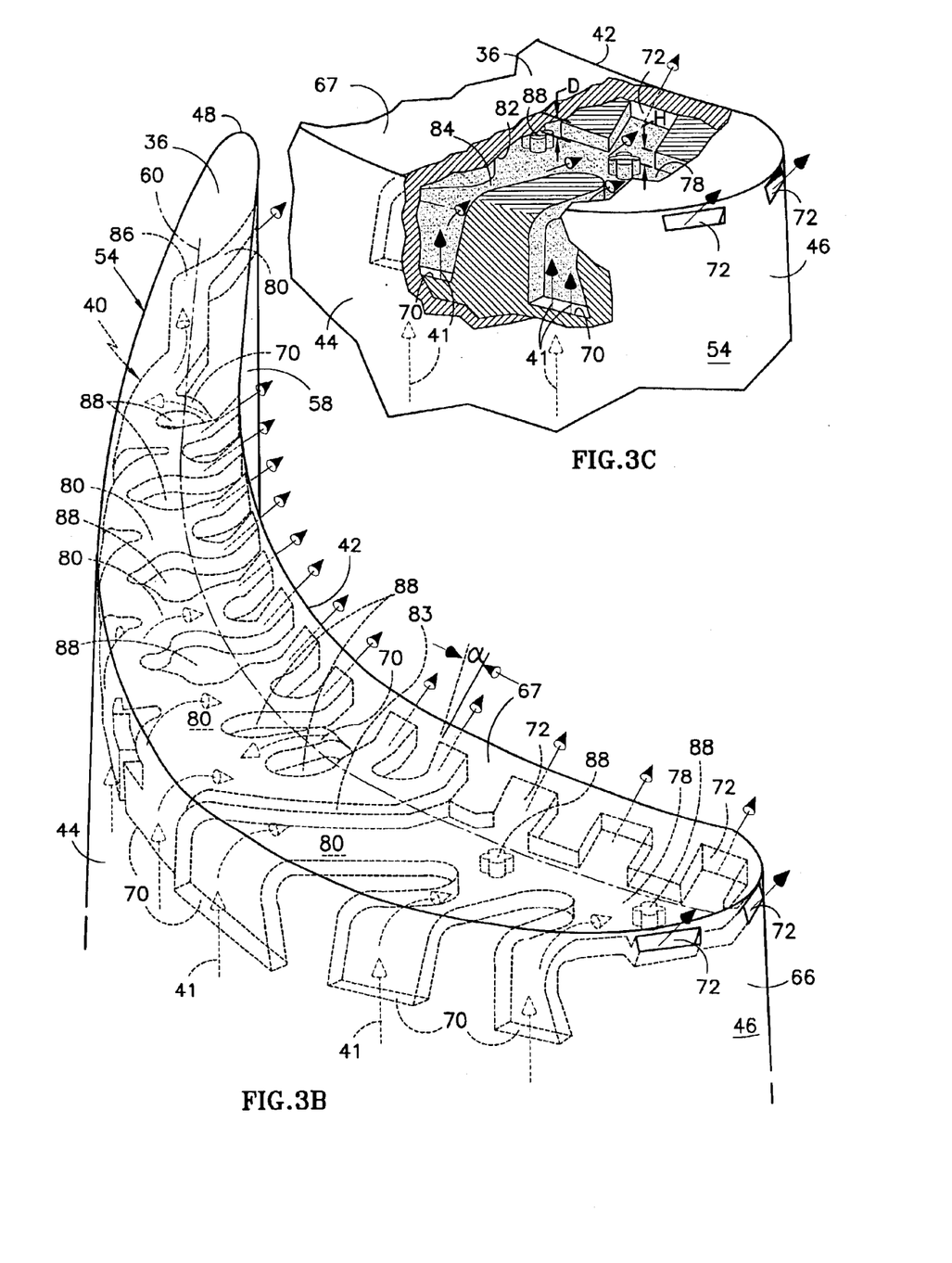
FIG. 3B is a partial perspective view of the tip of the airfoil of FIG. 3A.
FIG. 3C is an enlarged partial perspective view showing the tip adjacent the leading edge of the airfoil of FIG. 3B.

Referring now to FIGS. 3A, 3B and 3C, the features of the present invention will be further described with reference to an airfoil of the blade 24. FIG. 3. FIG. 3B is a partial perspective view of the tip of the airfoil of FIG. 3A. FIG. 3C is an enlarged perspective view showing the tip of the airfoil of FIG. 3B.

The blade 24 is cast and has a hollow airfoil 54 with the cavity 38 located therein. The blade 24 is disposed radially above the dovetail 30. The internal cavity 38 may be of any conventional form, multi-pass serpentine channels (cooling circuit), with the cooling air 41 typically being a portion of the air bled from the compressor 16 (FIG. 1) of the engine, as described hereinabove. Preferably, the airfoil 54 has a plurality of internal cooling cavities (cooling circuit) 38 that are connected to a source of cooling air, such as the compressor 16 (FIG. 1). The blade 24 includes a generally concave, first or pressure sidewall 42 spaced laterally or circumferentially in most part from a convex, second or suction sidewall 44. The sidewalls 42, 44 are joined together at axially opposite leading and trailing edges 46, 48, respectively, and extend longitudinally or radially from a root 50 where the airfoil 54 meets an integral platform 56 to the tip 36 or tip portion that encloses the airfoil 54. Thus, the airfoil 54 has an external wall 58 which includes the suction sidewall 44 and pressure sidewall 42 disposed on opposing sides of a mean camber line 60. The sidewalls 42, 44 extend chordwise between the leading and trailing edges 46, 48, respectively, and spanwise between the platform and the tip. Further, the external wall 58 includes an exterior surface 66, part of which is top surface (tip surface) 67. The hot combustion gases (gas flow) 28 flow across the exterior surface 66 of the airfoil 54.

Microcircuits offer tailorable, high convective efficiency cooling. Along with high convective efficiency, high film effectiveness is required for an advanced cooling configuration. FIG. 3A illustrates the microcircuit 40 of the present invention located outboard of the cavities 38. Microcircuits may be machined or otherwise molded within a part. In a preferred embodiment, the microcircuits are formed of refractory metals forms and encapsulated in the part mold prior to casting. Several refractory metals including molybdenum (Mo) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Specifically, such microcircuits may be fabricated into parts including, but not limited to, combustor liners, turbine vanes, turbine blades, turbine shrouds, vane endwalls, and airfoil edges. Preferably, such parts are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle. After casting, the refractory metal can be removed, such as through chemical removal, thermal leeching, or oxidation methods, leaving behind a cavity forming the microcircuit 40 as shown in FIG. 3A. It is noted that the cooling design of the present invention may also be manufactured using investment casting techniques with ceramic cores.

The present invention for tip cooling of a blade 24 includes the use of the microcircuit 40 traversely disposed within the tip 36 of the blade 24 as shown in FIG. 3. The cavities 38 are inboard of the microcircuit 40. The microcircuit 40 includes at least one inlet aperture 70, preferably a plurality of inlet apertures or inlets, and at least one outlet aperture 72, and preferably a plurality of outlet apertures or outlets.

The microcircuit 40 also includes at least one plenum or chamber 78, preferably two discrete plenums, in flow communication with the inlets 70 and the outlets 72. In the preferred embodiment, there are two plenums 78, separated by a rib 83. The plenums 78 traverse the tip 36. The plenums 78 are thus radially bound or defined with a top inner surface 82 and a bottom inner surface 84. In this way, the inlets 70 direct the cooling air 41 from the respective cavities 38 into the respective plenums 78 thus impinging the cooling air 41 onto an inboard surface of the tip 36. Also and preferably, each of the plenums 78 include a plurality of cooling passages or micropassages 80 through which the cooling air 41 is directed. The micropassages 80, located within the respective plenum 78 as shown in FIG. 3A, preferably interconnect with each other to provide mixing of the cooling air 41 as it transitions from the inlets 70 to the outlets 72 thus enhancing the heat transfer across the tip 36 of the airfoil 54. Preferably, the micropassages 80 are positioned generally cross-wise to the mean camber line 60 and cover the tip 36 from the leading edge 46 to the trailing edge 48, as shown in FIG. 3A. In this way, the cooling air 41 in the micropassages 80 travel in a general direction that opposes the flow direction of the hot combustion gases 28 flowing over the exterior surface of the airfoil 54. Also, it is preferred that the micropassages 80 converge from the inlets 70 towards the outlets 72. The benefits of these features will be detailed hereinafter.

The cooling air 41 exits through the outlets 72 to a region outside the airfoil 54. Preferably, the outlets 72 are rectangular in shape and flare outwards, as shown in FIG. 3B, to diffuse the cooling air 41 upon ejection therefrom. The diffusion angle, $\alpha$, as shown in FIG. 3B, is preferably approximately about equal or less than 12 degrees. It is also preferred that the outlets 72 are angled upward towards the tip 36 and most preferably, the outlets 72 are angled upward towards the tip 36 in a range from approximately about 0 to 45 degrees, as measured from a direction normal to the tip surface. Preferably, the outlets 72 are disposed proximate to the pressure sidewall 42, extend therethrough and are spaced apart as between the leading and trailing edges 46,48. Preferably, the inlets 70 are disposed adjacent and proximate to the suction sidewall 44 and extend in a generally radially direction so that the cooling air 41 is feed directly into the inlets 70 from respective cavities 38. The cooling air 41 is coldest downstream of the outlets 72 and due to internal convection, heats up as it travels towards the outlets 72. Heat is extracted from the tip 36 thus heating the cooling air 41 as it travels towards the outlets 72. Once the cooling air 41 is ejected from the micropassages 80, it can partially mix into the stream of hot combustion gases 28 and because of its own momentum, it can flow over the top of the tip 36. Thus, the ejected cooling air 41 film cools the exterior of the tip 36 by providing a film curtain that protects the tip 36 of the blade 24 from the hot combustion gases 28 and reduces leakage of the hot combustion gases 28 above the tip 36. In this way, the tip 36 of the airfoil 54 is cooled using both internal convection and external film cooling.

The present invention also incorporates the use of a passageway 86 in the trailing edge region of the tip 36 that extends from one of the plenums 78 generally along the mean camber line 60 of the airfoil 54 and ending proximate to the trailing edge 48. Preferably, the passageway 86 is defined by a length of approximately about 0.3 inches from the trailing edge 48 of the airfoil 54, due to limited space. Also and preferably, the passageway 86 is undulating to promote the formation of circulation cells thus increasing heat transfer in the trailing edge region of the tip 36.

As shown in FIG. 3C, located within the plenum 78 and in the path of the cooling air 41 flowing within the plenum 78 is at least one, and preferably, a plurality of pedestals 88 extending within the microcircuit 40. Preferably, the pedestals 88 extend from the top inner surface 82 of the microcircuit 40 to the bottom inner surface 84 of the microcircuit 40. Most preferably, the pedestals 88 are cast integral with the metal and extend in a generally radial direction within the plenum 78, cross-wise to the flow of the cooling air 41. The pedestals 88 serve to provide structural integrity to the blade 24 as well as enhancing the heat transfer inside the microcircuit 40 by creating a means of turbulence with the cooling air 41 as well as providing heat conduction paths. Preferably, the pedestals 88 are shaped, either regularly or irregularly, to promote turbulence and increase the heat conduction path. Most preferably, the preferred shape of the pedestals 88 is that of a clover design [three or four leaflets], preferably a four leaf design as shown in FIG. 3C. In the four leaflet design, the pedestals 88 have a cross section defined by four arcuate side panels that extend inwardly toward the pedestal center. It is understood by those skilled in the art and within the scope of this invention that there could be a variety of shapes employed for the pedestals 88 depending on the desired heat transfer enhancement. Further, it is also understood by those skilled in the art and within the scope of this invention that benefits and advantages of the pedestals 88 may be equally achieved by using the pedestals 88 located generally between or within the micropassages 80.

In the preferred embodiment, the height, H, of the microcircuit 40 is preferably of approximately about 0.012 inches to approximately about 0.025 inches, and most preferably about less than 0.017 inches. The distance, D, between the top surface of the tip 36 to the top inner surface 82 of the microcircuit 40 is approximately about 0.015 inches to approximately about 0.025 inches, and most preferably approximately about less than 0.020 inches. The height, H, and the distance D, are measured in the radial direction as shown in FIG. 3C.

Figure 4:
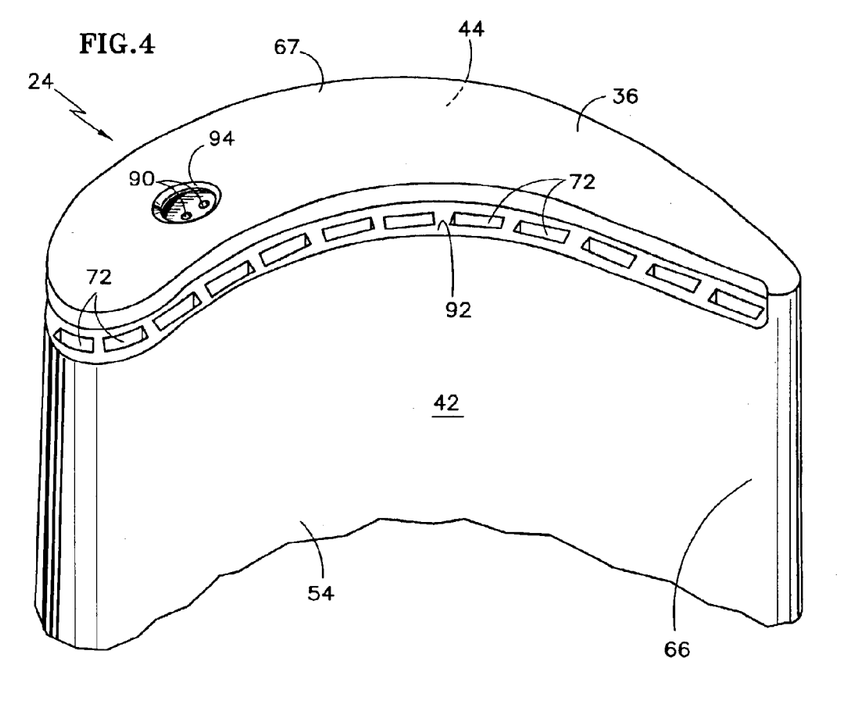
FIG. 4 is a partial external perspective view of the airfoil tip in accordance with another embodiment of the present invention.

Referring now to FIG. 4, at least one purge hole 90, preferably a plurality of purge holes, extends through the tip 36 and a countersunk portion 94 within the tip surface 67 to maintain the cavities 38 free of debris that can clog the same. The purge holes 90 do not interact with the cooling air 41 within the microcircuit 40 and are in flow communication only with the cavities 38 to purge any debris from the same.

Referring back to FIGS. 3A, 3B and 3C, the benefits of the present invention illustrated and described herein will now be detailed. The present invention has the added benefit over the prior art of minimizing the leakage of hot combustion gases 28 over the tip 36. Blade tip leakage is a function of the pressure difference between the pressure and suction sides of the airfoil 54 and the acceleration of the hot combustion gases 28 towards the tip 36. Blade tip leakage results from the hot combustion gases 28 going into a gap between the tip 36 of the blade 24 and the blade outer air seals (not shown). This leakage is undesirable as the hot combustion gases 28 are not traveling through the turbine 20 to produce work. In the present invention, the cooling air 41 exits the outlets 72 in the form of coolant jets. The jets accelerate into the hot combustion gas 28 flow to form a film curtain over the tip 36 thus preventing the hot combustion gases 28 from leaking over the tip 36 of the blade 24.

Further, the present invention also limits the amount of cooling air 41 extracted from the internal cavities 38 of the blade 24 to achieve desirable and optimal tip cooling results. As mentioned hereinabove, the cooling air supply is obtained from the compressor 16 (FIG. 1) and is ultimately discharged into a region in the turbine 20. This is air that is taken away from the compressor 16 (FIG. 1) and from producing useful turbine work. The inlets 70 of the present design are therefore sized to be less than about 0.5% of the free stream gas flow to reduce these parasitic loses.

The cooling effectiveness ratio is defined as the ratio of the temperature difference of the hot combustion gases 28 and the bulk metal temperature to the temperature difference between the hot combustion gases 28 and the coolant (cooling air). Preferably, turbine engineers and designers try to design for a cooling effectiveness ratio in excess of about 70% because the cooler the metal temperature the better the overall durability of the blade 24. This is achieved in the present invention in two ways. First, film cooling is employed to reduce the temperature of the hot combustion gases 28. The temperature is reduced due to the mixing of the cooling air 41 as it ejects from the outlets 72 into the hot combustion gas flow. But, it is not desirable to rely on this method completely since, as addressed hereinabove, the more cooling air 41 taken away from the compressor 16 (FIG. 1), the less work the compressor 16 (FIG. 1) can produce. So, and as described above, the present invention employs a novel approach to internally convectively cool the tip 36 to achieve a desirable cooling effectiveness ratio. It is noted that traditional film cooling of the tips of airfoils does not employ this method to a high and reliable degree of efficiency. The measure of convective cooling efficiency is a function of the heat pick up of the cooling air 41 as it travels within the microcircuit 40, as follows:

$$\eta_c = [T_{coolant,out} - T_{coolant,in}]/[T_{metal} - T_{coolant,in}]$$

where:

$T_{coolant,out}$=temperature of the cooling air exiting the outlets $T_{coolant,in}$=temperature of the cooling air entering the inlets $T_{metal}$=bulk metal temperture of the airfoil.

In the equation above, turbine engineers and designers seek a design with a high heat pick up thus cooling the tip 36 of the airfoil 54. The present design achieves this increased heat pick up in a number of ways, as will now be detailed. First, the pedestals 88 are turbulence promoters within the micropassages 80 of the microcircuit 40. Second, the pedestals 88 also serve to increase the surface area thereby enhancing the conductive heat transfer path. Third, the inlets 70 provide a source of impingement cooling of the tip 36 as the cooling air 41 transitions from the inlets 70 respective micropassages 80. Preferably, the inlets 70 impinge the tip 36 proximate to the suction side of the airfoil 54. The impingement on the suction side is very desirable since the suction side of the airfoil 54 is prone to external rolling vortices which impose high thermal loads on the suction sidewall 44 of the blade 24. These vortices are caused by the gases 28 flowing over the tip of the airfoil 54 and falling over onto the suction side mainstream flow. These vortices have a certain angular momentum and direction when they cascade and fall over onto the suction side and interfere with the mainstream gas flow thus creating the vortex effect. Thus, the present invention does not rely completely on film cooling to cool the tip 36.

The present invention also has the added benefit of convergent micropassages 80. The cooling air 41 is subsonic so the convergence of the micropassages 80 between the inlets 70 and the outlets 72 serves to advantageously accelerate the flow and increase the heat transfer coefficient. Thus, the microcircuit 40 of the present invention provides yet another means to increase heat pick up.

Still further, the present invention provides the capability to tailor the chordline spacing of the outlets 72 that provide film cooling to the tip 36. In the prior art, the spacing between the film cooling holes provides modest film cooling coverage. The cooling of the metal in this area depends on conduction within the metal to cool the tip surface and, as such, the metal experiences temperatures higher than the average film temperature. The design of the present invention permits the spacing of the holes to be closer together at areas of the tip 36 where the tip leakage is greater. The present invention, unlike the prior art, advantageously provides for the shape of the outlets 72 to be rectangular in shape and have a cross-sectional area that increases as the flow transitions through the outlets 72. This increase of the cross-sectional area or divergence of the outlets 72 advantageously diffuses the cooling air 41. By diffusing the cooling air 41 as it exits the outlets 72, the coverage of the cooling film is increased. This increases effectiveness of the film curtain at the tip 36 thereby minimizing undesirable tip leakage. In prior art designs, the holes are circular in shape as the method of manufacture is drilling. Thus, in the present invention, the coverage provided by film cooling is effective and efficient as compared to the prior art designs.

Referring now to FIG. 4, a partial external perspective view of the airfoil tip 36 in accordance with another embodiment of the present invention is shown. In this alternative embodiment, a shelf 92 is employed preferably on the top surface 67 of the tip 36 adjacent to the pressure side of the airfoil 54. Thus, the outlets 72 can alternatively be positioned on the shelf 92 such that the cooling air 41 is ejected from the outlets 72 onto the top surface 67 of the tip 36, as opposed to the pressure side of the airfoil 54 shown in FIG. 3A.

As described above, the present invention can be implemented and utilized on connection with many alternative airfoil (blade and vane) configurations. Further, it is understood by those skilled in the art and within the scope of this invention, that the arrangement of the micropassages 80 and the spacing therebetween, the size of the pedestals 88, outlet and inlet size and orientation can all be varied to optimize the tip cooling for a given airfoil design.

Thus, the present invention provides a cooling system that employs a novel approach to film and convectively cool an airfoil. In particular, this combination provides an advantage over the prior art tip cooling schemes in that, to achieve the same metal temperature at the tip 36, less cool compressor air is required to cool the tip 36. Less compressor bleed flow results in the additional advantage of providing an increase in turbine efficiency. As compared to the prior art, the present invention provides a novel microcircuit tip cooling design to synergistically improve performance and extend blade life. The microcircuit 40 of the present invention provides an improved means to film cool the tip 36 as well as a new approach to efficiently and effectively convectively cool the tip 36. The combination of a) effective convective cooling provided by the micropassages 80 and b) effective thermal insulation on the tip surface due to film cooling provides a cooler tip as compared to conventional and current designs. Thus, a tip 36 employing the beneficial cooling design of the present invention will not only have a longer service life but also improve overall turbine efficiency.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

We claim:

1. A turbine blade comprising:
   a hollow airfoil into which cooling flow is flowable from an end of said airfoil, said airfoil including pressure and suction sidewalls joined together at leading and trailing edges and extending from a root to a tip;
   at least one micropassage disposed within said tip, said micropassage includes an inlet and an outlet, said inlet and said outlet in flow communication with said micropassage;
   a means for providing cooling flow to said airfoil wherein said cooling flow enters said inlet from said airfoil transitions through said micropassage and exits at said outlet into a region outside said airfoil; and
   at least one pedestal, said pedestal radially extends at least in part in the path of said cooling flow flowing in said micropassage.

2. The blade of claim 1, wherein said pedestal is shaped to promote turbulence of said cooling flow within said micropassage and increase the heat conduction surface of said tip.

3. The blade of claim 2, wherein said pedestal is clover shaped.

4. The blade of claim 1, wherein said inlet is in flow communication with a cooling circuit located within said airfoil and said outlet extends through one of said sidewalls and directed against said tip for impinging said cooling flow thereagainst.

5. The blade of claim 4, wherein said outlet is disposed within said pressure sidewall and is angled upward towards said tip in the range between about 0 degrees to about 45 degrees with respect to an axis normal to a top exterior surface of said tip.

6. The blade of claim 4, wherein said micropassage is oriented substantially across said tip between said suction and pressure sidewalls.

7. The blade of claim 6 further including:
   at least one micropassage oriented approximately along a mean camber line of said airfoil proximate to said trailing edge and in flow communication with said micropassage oriented substantially across said tip between said suction and pressure sidewalls;
   wherein said cooling flow from said at least one micropassage oriented substantially across said tip between said suction and pressure sidewalls enters said micropassage oriented approximately along the mean camber line of said airfoil proximate to said trailing edge and exits through an outlet disposed within an exterior surface of said pressure sidewall proximate to said trailing edge.

8. The blade of claim 4 wherein said micropassage converges towards said outlet and said outlet diverges to diffuse said cooling flow therein.

9. The blade of claim 4, wherein said cooling flow transitions through said micropassage in a direction that opposes the direction of a gas flow, said gas flow flowing across an exterior surface of the blade.

10. The blade of claim 1, wherein said tip includes a countersunk top surface portion at least in part from one of said sidewalls and said outlet extends through said countersunk top surface portion for film cooling of said tip.

11. The blade of claim 1, wherein said micropassage has a radial height no greater than 0.025 inches.

12. The blade of claim 1, wherein the radial thickness of said tip above said micropassage is no greater than 0.025 inches.

13. An airfoil comprising:
   pressure and suction sidewalls joined together at leading and trailing edges and spaced apart from each other therebetween to define an internal cavity extending longitudinally between a root and a tip of the airfoil into which cooling air is flowable from an end of said internal cavity;
   at least one plenum traversely disposed between said first and second sidewalls;
   a plurality of inlets in flow communication with said plenum, said inlets being separate and spaced apart and positioned proximate to said tip and adjacent said suction sidewall;
   a plurality of outlets in flow communication with said plenum; and
   a means for providing cooling air wherein the cooling air enters said inlets, transitions into said plenum and exits said outlets into a region outside the airfoil.

14. The airfoil of claim 13, wherein said inlets are in flow communication with the cooling air within a cooling circuit located within the airfoil, said inlets directed against said tip for impinging the cooling air thereagainst.

15. The airfoil of claim 14, wherein said outlets are disposed within said pressure sidewall and are angled upward towards said tip in the range between about 0 degrees to about 45 degrees with respect to an axis normal to a top exterior surface of said tip.

16. The airfoil of claim 14, wherein said plenum includes a plurality of micropassages oriented generally across said tip between said suction and pressure sidewalls and in flow communication with said inlets and said outlets, said micropassages are arranged to be fed the cooling air from said inlets and to discharge the cooling air through said outlets.

17. The airfoil of claim 16 further including:
   at least one micropassage oriented approximately along a mean camber line of said airfoil proximate to said trailing edge and in flow communication with said at least one of said micropassages;
   wherein the cooling air from at least one of said micropassages enters said micropassage oriented along the mean camber line of the airfoil proximate to said trailing edge and exits through an outlet disposed within an exterior surface of said pressure sidewall proximate to said trailing edge.

18. The airfoil of claim 16, wherein the cooling air transitions through said micropassages in a direction that opposes the direction of a gas flow, said gas flow flowing across an exterior surface of the airfoil.

19. The airfoil of claim 16, wherein said micropassages interconnect and said plenum has a radial height of no greater than about 0.025 inches.

20. The airfoil of claim 13, further including at least one pedestal, said pedestal radially extends at least in part in the path of the cooling air flowing in said plenum.

21. The airfoil of claim 20, wherein said pedestal is shaped to promote turbulence of the cooling air within said plenum and increase the heat conduction surface of said tip.

22. The airfoil of claim 21, wherein said pedestal is clover shaped.

23. The airfoil of claim 13, wherein said tip includes a countersunk top surface portion at least in part from one of said sidewalls and said outlets extend through said countersunk top surface portion for film cooling of said tip.

24. The airfoil of claim 13, wherein a top exterior surface of said tip includes a shelf adjacent to said pressure sidewall and said outlets are disposed within said shelf such that the cooling air is ejected from said outlets onto said top exterior surface of said tip.

25. The airfoil of claim 13, wherein the radial thickness of said tip above said plenum is no greater than 0.025 inches.

26. An embedded microcircuit suitable for use in a tip of a hollow airfoil having a pressure sidewall and a suction sidewall, said pressure and suction sidewalls joined together at leading and trailing edges and extend from a root to the tip, the microcircuit comprising:

a plurality of inlets through which cooling air may enter;

a plurality of interconnect micropassages in flow communication with said inlets and through which the cooling air may enter;

a plurality of outlets in flow communication with said micropassages, said outlets are disposed within said pressure sidewall and transition the cooling air from said micropassages to a region exterior to the tip of the airfoil; and a means for supplying the cooling air to said inlets, wherein said interconnect micropassages permit flow communication between said interconnect micropassages after said inlets and before said outlets.

27. The microcircuit of claim 26, further including at least one pedestal disposed in the microcircuit and in the path of the cooling air to turbulate the cooling air flowing within the microcircuit.

28. The microcircuit of claim 27, wherein said pedestal is shaped to promote turbulence within the microcircuit and increase the heat conduction surface thereof.

29. The microcircuit of claim 28, wherein said pedestal is clover shaped.

30. The microcircuit of claim 26, wherein said inlets are in flow communication with the cooling air within a cooling circuit located within the airfoil, said inlets directed against the tip for impinging the cooling air thereagainst.

31. The microcircuit of claim 30, wherein said outlets are angled upward towards said tip in the range between about 0 degrees to about 45 degrees with respect to an axis normal to a top exterior surface of the tip.

32. The microcircuit of claim 26, wherein said micropassages are oriented to substantially traverse the tip between the suction and pressure sidewalls, said micropassages are arranged to be fed the cooling air from said inlets and to discharge the cooling air through said outlets.

33. The microcircuit of claim 32 further including:

at least one micropassage oriented approximately along a mean camber line of the airfoil proximate to the trailing edge and in flow communication with at least one of said micropassages;

wherein the cooling air from said interconnect micropassages enters said micropassage oriented along the mean camber line of the airfoil proximate to the trailing edge and exits through an outlet disposed within an exterior surface of the pressure sidewall proximate to the trailing edge.

34. The microcircuit of claim 32, wherein the cooling air transitions through said micropassages in a direction the opposes the direction of a gas flow, said gas flow flowing across and exterior surface of the airfoil.

35. The microcircuit of claim 26, wherein said outlets are angled upward towards the tip in the range between about 0 degrees to about 45 degrees with respect to an axis normal to a top exterior surface of the tip.

36. The microcircuit of claim 26, wherein a top exterior surface of said tip includes a shelf adjacent to said pressure sidewall and said outlets are disposed within said shelf such that the cooling air is ejected from said outlets onto said top exterior surface of said tip.

37. The microcircuit of claim 26, wherein the microcircuit has a radial height no greater than 0.025 inches.

38. A method for cooling a tip of a turbine blade suitable for use in gas turbine, comprising the steps of:

fabricating a microcircuit under a surface of the tip, said microcircuit comprising:

an inlet to allow passage of cooling flow from a cooling fluid source within the blade;

a plurality of interconnecting micropassages in flow communication with said inlet and through which cooling flow may enter; and an outlet in flow communication with said micropassages, said outlet transitions the cooling flow from said micropassages to a region exterior to the tip of the airfoil;

wherein said interconnect micropassages permit flow communication between said interconnect micropassages after said inlet and before said outlet; and providing cooling flow from the cooling fluid source to flow into said inlet, through said plurality of micropassages, and out of said outlet to exit into the gas stream at the tip of the blade.

39. The method of claim 38, wherein said fabricating said microcircuit comprises the steps of:

fashioning a refractory metal into the form of said micropassages;

inserting said refractory metal into a mold for casting the blade; and removing said refractory metal from the blade after casting.

40. The method of claim 38, wherein said blade is fabricated from a metal selected from the group consisting of nickel based alloys and cobalt based alloys.

41. The method of claim 38, wherein said micropassages are fabricated under the surface of said blade at a distance no greater than about 0.03 inches.

42. The method of claim 38, wherein said microcircuit further includes at least one pedestal, said pedestal radially extends at least in part in the path of the cooling flow.

43. The method of claim 42, wherein fabricating a microcircuit further comprises sizing said at least one pedestal to turbulate the cooling flow within said microcircuit.

44. The method of claim 38, wherein said interconnect micropassages converge towards said outlet.

\* \* \* \* \*